(12) United States Patent
Pawar et al.

(10) Patent No.: US 10,342,021 B1
(45) Date of Patent: Jul. 2, 2019

(54) MINIMIZING INTERFERENCE IN WIRELESS NETWORKS

(71) Applicant: Sprint Spectrum LP, Overland Park, KS (US)

(72) Inventors: Hemanth Pawar, Brambleton, VA (US); Shilpa Kowdley, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 158 days.

(21) Appl. No.: 15/367,528

(22) Filed: Dec. 2, 2016

(51) Int. Cl.
| | |
|---|---|
| *H04B 7/06* | (2006.01) |
| *H04W 72/08* | (2009.01) |
| *H04B 7/0408* | (2017.01) |
| *H04W 40/16* | (2009.01) |

(52) U.S. Cl.
CPC ........ *H04W 72/082* (2013.01); *H04B 7/0408* (2013.01); *H04W 40/16* (2013.01)

(58) Field of Classification Search
None
See application file for complete search history.

(56) References Cited

U.S. PATENT DOCUMENTS

| | | | |
|---|---|---|---|
| 2006/0009244 A1* | 1/2006 | Schacht | H04W 72/1247 455/500 |
| 2014/0307638 A1* | 10/2014 | Zacharias | H04L 5/0053 370/329 |
| 2015/0085718 A1* | 3/2015 | Chen | H04B 7/2656 370/280 |
| 2015/0085720 A1 | 3/2015 | Gaal et al. | |
| 2015/0282001 A1* | 10/2015 | Kwak | H04B 7/0617 370/229 |
| 2016/0197671 A1 | 7/2016 | Hwang et al. | |

\* cited by examiner

*Primary Examiner* — Kevin C. Harper
*Assistant Examiner* — Derrick V Rose

(57) ABSTRACT

Minimizing interference including obtaining interference measurements for transmission angles of an interference-causing side lobe of a formed beam directed towards a wireless device in a beamforming mode, and determining threshold angles wherein an operating mode of another wireless device subject to the interference is switched to from a default mode to a carrier aggregation mode utilizing a different frequency than the formed beam. Upon the transmission angle of the formed beam meeting a second threshold angle, the operating mode of the other wireless device is switched back to the default mode.

18 Claims, 5 Drawing Sheets

MINIMIZING INTERFERENCE IN WIRELESS NETWORKS

TECHNICAL BACKGROUND

As wireless networks evolve and grow, there are ongoing challenges in providing high-quality service to increasing numbers of wireless devices or user equipment (UE) in various coverage areas of a wireless network. For example, beamforming is a transmission mode that is used to provide better coverage to wireless devices in specific locations within a coverage area of a cell or access node. A beamforming downlink transmission mode uses multiple antennae to direct or "steer" signals from the antennae towards a particular wireless device located at, for instance, a cell edge. However, when wireless devices are at certain positions in the coverage area, formed beams directed to those wireless devices can interfere with other wireless devices within the coverage area, thereby degrading performance for the other wireless devices. For example, when wireless devices are in certain positions relative to one another, a side lobe of a formed beam directed towards a first wireless device may overlap with, or intersect, a wireless transmission between another wireless device and an access node. Although the first wireless device remains unaffected, the intersecting signals may cause interfere for the second wireless device, particularly when both transmissions utilize the same frequencies. Further, orthogonal frequency-division multiple access based systems, such as LTE, are especially prone to such interference between wireless devices in adjacent sectors, as they are commonly deployed with a frequency reuse factor of 1.

Overview

Exemplary embodiments described herein include systems, methods, and processing nodes for minimizing interference caused by formed beams to other wireless devices in a wireless network. An exemplary method for minimizing interference includes determining that a first angle of a first formed beam directed towards a first wireless device meets a first threshold angle. An interference is caused to a second wireless device by a lobe of the first formed beam upon the first angle meeting the first threshold angle. The method switches an operating mode of the second wireless device from a default mode to an aggregated mode. In the aggregated mode, additional resources are scheduled for the second wireless device based in part on the interference.

An exemplary system for minimizing interference in a wireless network includes a processing node and a processor coupled to the processing node. The processor configures the processing node to perform operations including obtaining one or more interference measurements for each of a plurality of transmission angles of a first formed beam directed towards a first wireless device. The one or more interference measurements for each transmission angle are associated with a fixed location. The operations further include determining a first threshold angle based on the one or more interference measurements for each transmission angle. Upon the transmission angle of the formed beam meeting the first threshold angle, an operating mode of a second wireless device at the fixed location is switched to from a default mode to a carrier aggregation mode. The operations further include determining a second threshold angle based on the one or more interference measurements for each transmission angle. Upon the transmission angle of the formed beam meeting the second threshold angle, the operating mode of the second wireless device at the fixed location is switched back to the default mode.

An exemplary processing node for minimizing interference in a wireless network is configured to perform operations including determining an interference caused by a first formed beam directed towards a first wireless device caused to a second wireless device, and switching an operating mode of the second wireless device to an aggregated mode based on the interference. The aggregated mode aggregates two different carriers.

DETAILED DESCRIPTION

Figure 1:
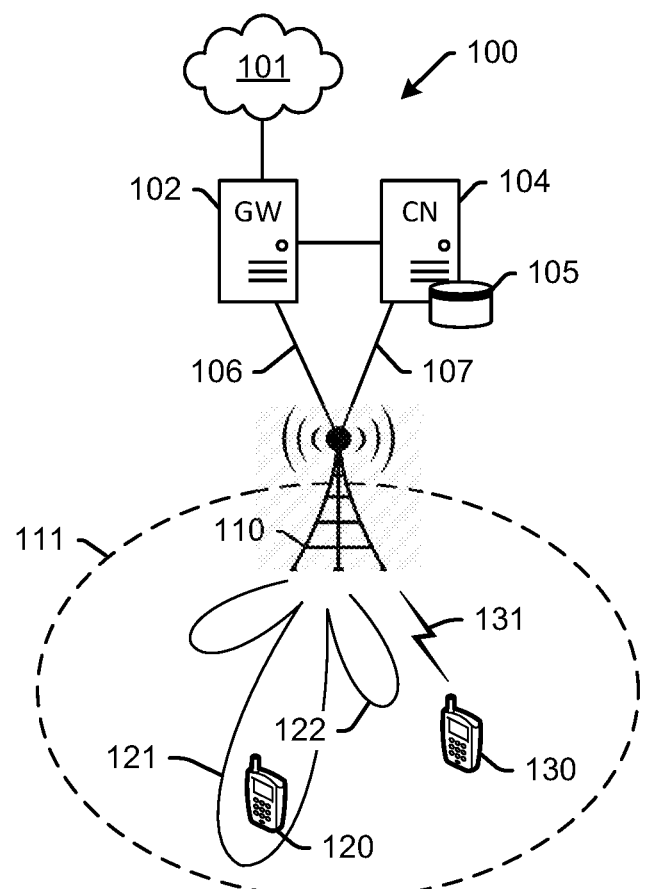
FIG. 1 depicts an exemplary system for minimizing interference in a wireless network.

In embodiments disclosed herein, variations in a transmission angle of a formed beam directed to a first wireless device moving around a sector are monitored. One or more threshold angles are defined based on a potential interference caused to a second wireless device by one or more lobes of the formed beam. For example, the formed beam may utilize a first carrier, such as a time-division-duplexed (TDD) carrier. The second wireless device may utilize the same TDD carrier (or another carrier utilizing the same frequency spectrum) in a default operating mode. Thus, when the transmission angle of the formed beam meets a first threshold angle, it is likely to cause interference to the second wireless device by virtue of the default operating mode and the formed beam using the same frequency spectrum.

The threshold angles may be based on predetermined characteristics of the lobe, such as a size of the lobe. The size of the lobe may be predetermined based on an antenna configuration of an access node deploying the formed beam. For example, a given antenna configuration and known transmit power, a lobe size may be predetermined and/or specified by a manufacturer of a sectorized antenna for a plurality of different transmission angles. The threshold angles may further be based on interference measurements for each of the plurality of transmission angles. For example, the interference measurements may be performed at a fixed location in a neighboring sector as the transmission angle of the formed beam is varied in its own sector. As the lobe of the formed beam causes various levels of interference, depending on its size and other characteristics (as described above), a range of angles is determined as causing interference to wireless devices at the fixed location. The transmission angle and the first and second threshold angles can be measured relative to the fixed location, or to a sector boundary, or to any other reference point that can be used by the access node.

Consequently, upon the transmission angle of the formed beam meeting a first threshold angle, an operating mode of a second wireless device is switched from a default mode to an aggregated mode. The second wireless device may be in the same sector as the formed beam, or in an adjacent sector deployed by the same access node. The aggregated mode utilizes a combination of the first carrier and a second carrier. The second carrier may comprise a carrier utilizing a different frequency band and/or operating mode than the first carrier. For example, the second carrier may comprise a frequency-division-duplexing (FDD) carrier. In the aggregated mode, additional resources are scheduled for the second wireless device based in part on the interference caused by the lobe of the formed beam. For example, the additional resources may comprise downlink resources on the FDD carrier that are aggregated with the resources in the TDD carrier used by the default mode. Since the interference caused by the formed beam affects the downlink TDD channel, FDD resources are aggregated in the downlink channel.

As the first wireless device continues moving in the same or similar direction, the transmission angle of the formed beam may reach an angle wherein the lobe stops causing interference to the second wireless device. This second threshold angle may also be determined based on the size/shape of the lobe and/or interference reports as described above. When the transmission angle of the formed beam reaches the second threshold angle the operating mode of the second wireless device may be switched back to the default mode. The second threshold angle may be defined relative to the fixed location or position of the second wireless device. Thus, if the second wireless device changes its position, the thresholds are also changed, such that each threshold represents whether or not the formed beam may cause interference to the second wireless device at the given location.

Similar operations may be performed in real time for a plurality of formed beams at a plurality of locations, whether in the same sector as each formed beam, or in adjacent sectors. The operations disclosed herein may be performed alongside or by a scheduling module of a network node such as a controller node or access node, and may be repeated at time intervals such as a transmission time interval (TTI), or a preconfigured time period. These and additional operations are further described with respect to the embodiments depicted in FIGS. 1-5 below.

FIG. 1 depicts an exemplary system 100 for transmission mode selection. System 100 comprises a communication network 101, gateway 102, controller node 104, access node 110, and end-user wireless devices 120 and 130. Access node 110 is illustrated as having coverage area 111, with end-user wireless devices 120, 130 being located within coverage area 111 and accessing network services directly from access node 110 via an air interface deployed by access node 110. Access node 110 can be any network node configured to provide communication between end-user wireless devices 120, 130 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, or the like. In other embodiments, access node 110 can be a small access node including a microcell access node, a picocell access node, a femtocell access node, or the like such as a home NodeB or a home eNodeB device. Access node 110 can comprise a plurality of antennae and transceivers for enabling communication using various operating modes and different frequency bands or carriers. For example, access node 110 deploys a formed beam 121 (i.e., using a beamforming operating mode) to communicate with wireless device 120, and a communication link 131 (using a default operating mode) to communicate with wireless device 130. Moreover, it is noted that while access node 110 is illustrated in FIG. 1, any number of access nodes and relay nodes can be implemented within system 100.

In operation, variations in a transmission angle of formed beam 121 directed to wireless device 120 are monitored as wireless device 120 moves around coverage area 111. Formed beam 120 may utilize a first carrier, such as a time-division-duplexed (TDD) carrier, and communication link 131 may utilize the same TDD carrier such that lobe 122 is likely to cause interference to communication link 131 as wireless device 120 approaches closer to wireless device 130. Therefore, one or more threshold angles are defined based on a potential interference caused to wireless device 130 by a lobe 122 of formed beam 121. The threshold angles may be determined based on characteristics of formed beam 121 and lobe 122 thereof, which are predetermined based on an antenna configuration of access node 110 and other factors. The threshold angles may further be determined based on interference measurements performed at various locations throughout coverage area 111, that include the location or position of wireless device 130.

Upon the transmission angle of formed beam 121 meeting a first threshold angle, an operating mode second wireless device 130 is switched from a default mode to an aggregated mode. Second wireless device 130 may be in the same sector as first wireless device 121, or in an adjacent sector deployed by access node 110. The aggregated mode utilizes a combination of the first carrier and a second carrier, with additional resources on the second carrier being scheduled for second wireless device 130 based in part on the interference caused by lobe 122 of formed beam 121. As wireless device 120 continues moving in the same or similar direction, the transmission angle of formed beam 121 may reach an angle wherein lobe 122 stops causing interference to communication link 131. This second threshold angle may also be determined based on the size/shape of lobe 122 and/or interference reports as described above. When the transmission angle of formed beam 121 reaches the second threshold angle, the operating mode of second wireless device 130 may be switched back to the default mode.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information such as threshold angles for each of a plurality of locations within coverage area 111, and for each of a plurality of transmission angle of formed beams such as formed beam 121. This information may be requested by or shared with access node 110 via connections 106, 107, X2 connections, and so on. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
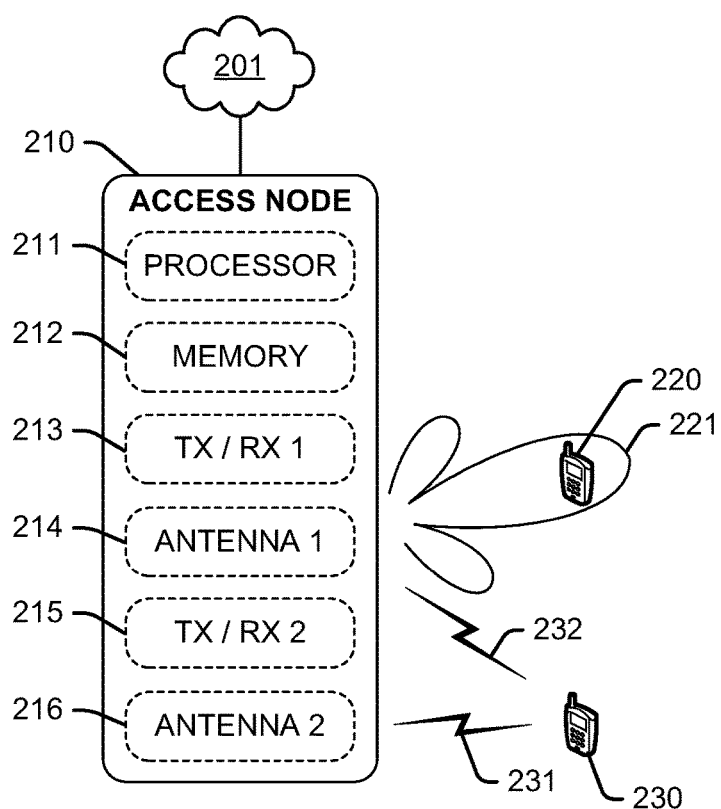
FIG. 2 depicts an exemplary access node for minimizing interference in a wireless network.

FIG. 2 depicts components of an exemplary access node 210. Access node 210 comprises a processor 211, a memory 212, a first transceiver 213, a first antenna 214, a second transceiver 215, and a second antenna 216. Small access node 210 is illustrated as deploying a first carrier using first transceiver 213 and first antenna 214. The first carrier may utilize a specific frequency band, and can be utilized in one or more operating modes. For example, antenna 214 can be used to deploy a formed beam 221 to communicate with wireless device 220, and a regular cellular communication link 232 to communicate with wireless device 230. Transceiver 213 and antenna 214 may be configured to operate in a time-division-duplexing (TDD) operating mode. It should be understood that each antenna 214, 216 can comprise a plurality of antennae or antennae arranged in one or more arrays.

Access node 210 is further illustrated as deploying a second carrier using second transceiver 215 and second antenna 216 utilizing another frequency band that is different from the frequency band utilized by antenna 214 and transceiver 213. For example, antenna 216 can be used to deploy a regular cellular communication link 231 to wireless device 230. Transceiver 215 and antenna 216 may be configured to operate in a frequency-division-duplexing (FDD) operating mode. Consequently, and as further described herein, communication link 232 with wireless device 230 may be affected by interference caused by a side lobe of formed beam 221, such that additional resources are scheduled on communication link 231 utilizing a different frequency, and links 232 and 231 are aggregated at wireless device 230 in order to mitigate the negative effects caused by the interference. Such operations may be stored in memory 212 as logical instructions that are executed by processor 211.

Figure 3:
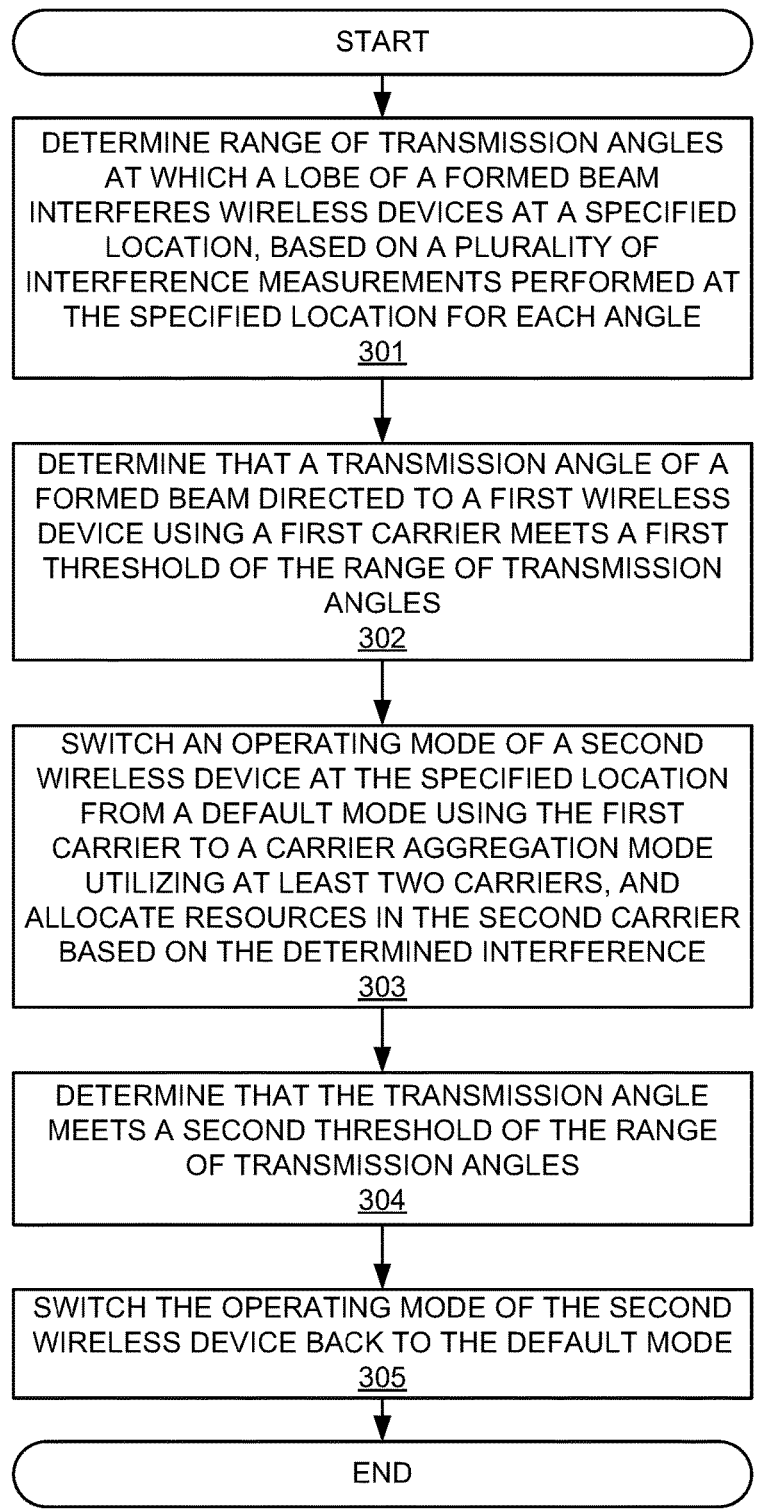
FIG. 3 depicts an exemplary method for minimizing interference in a wireless network.

FIG. 3 depicts an exemplary method for minimizing interference in a wireless network. The method of FIG. 3 is illustrated with respect to any network node such as a currently-serving access node, or a controller node. In other embodiments, the method can be implemented with any suitable network element. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 301, a range of transmission angles are determined based on a potential interference caused to wireless devices at a specified location by one or more lobes of a formed beam, and first and second threshold angles are determined based on whether or not the one or more lobes can potentially interfere with wireless signals for the specific location. The threshold angles may be based on predetermined characteristics of the lobe, such as a size of the lobe. The size of the lobe may be predetermined based on an antenna configuration of an access node deploying the formed beam. For example, a given antenna configuration and known transmit power, a lobe size may be predetermined and/or specified by a manufacturer of a sectorized antenna for a plurality of different transmission angles. The threshold angles may further be based on interference measurements for each of the plurality of transmission angles. For example, the interference measurements may be performed at a fixed location in a neighboring sector as the transmission angle of the formed beam is varied in its own sector. As the lobe of the formed beam causes various levels of interference, depending on its size and other characteristics (as described above), a range of angles is determined as causing interference to wireless devices at the fixed location. The transmission angle and the first and second threshold angles can be measured relative to the fixed location, or to a sector boundary, or to any other reference point that can be used by the access node.

At 302, a transmission angle of a formed beam directed towards a wireless device is monitored to determine whether or not is meet one of the threshold angles, such that is it is likely to cause interference to wireless devices at the location. Consequently, at 303, upon the transmission angle of the formed beam meeting a first threshold angle, an operating mode of a second wireless device is switched from a default mode to an aggregated mode, i.e. a mode utilizing carrier aggregation. The second wireless device may be in the same sector as the formed beam, or in an adjacent sector deployed by the same access node. The aggregated mode utilizes a combination of the first carrier and a second carrier, or any combination of two carriers. The second carrier or at least one of the two carriers may comprise a carrier utilizing a different frequency band and/or operating mode than the first carrier. For example, the first carrier and/or the carrier of the formed beam may comprise a TDD carrier, and the second carrier may comprise an FDD carrier, such that subsequent transmissions to the second wireless device are not subject to interference caused by the formed beam. Further, additional resources scheduled for the second wireless device based in part on the interference caused by the lobe of the formed beam. For example, the additional resources may comprise downlink resources on the FDD carrier that are aggregated with the resources in the TDD carrier used by the default mode. Since the interference caused by the formed beam affects the downlink TDD channel, FDD resources are aggregated in the downlink channel.

At 304, as the first wireless device continues moving in the same or similar direction, the transmission angle of the formed beam may reach an angle wherein the lobe stops causing interference to the second wireless device. This second threshold angle may also be determined based on the size/shape of the lobe and/or interference reports as described above. Consequently, at 305, when the transmission angle of the formed beam reaches the second threshold angle the operating mode of the second wireless device may be switched back to the default mode. The second threshold angle may be defined relative to the fixed location or position of the second wireless device. Thus, if the second wireless device changes its position, the thresholds are also changed, such that each threshold represents whether or not the formed beam may cause interference to the second wireless device at the given location.

Similar operations may be performed in real time for a plurality of formed beams at a plurality of locations, whether in the same sector as each formed beam, or in adjacent sectors. The operations disclosed herein may be performed alongside or by a scheduling module of a network node such as a controller node or access node, and may be repeated at time intervals such as a transmission time interval (TTI), or a preconfigured time period. Further, in some embodiments, a predictive calculation may be performed as the first wireless device is in motion, such that a requirement to switch modes of the second wireless device is predicted prior to any thresholds being met or interference being caused.

Figure 4A:
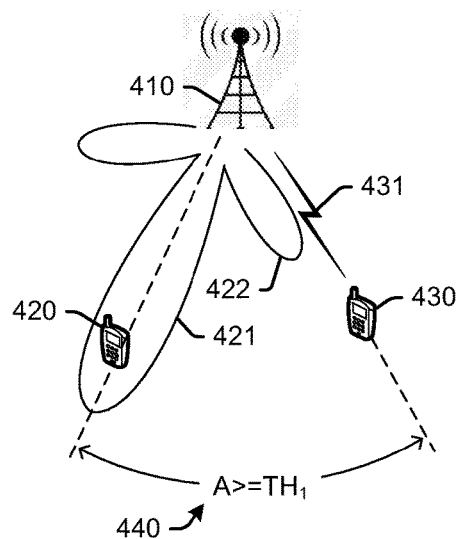
FIG. 4A-4C depict exemplary threshold angles for minimizing interference in a wireless network.
Figure 4B:
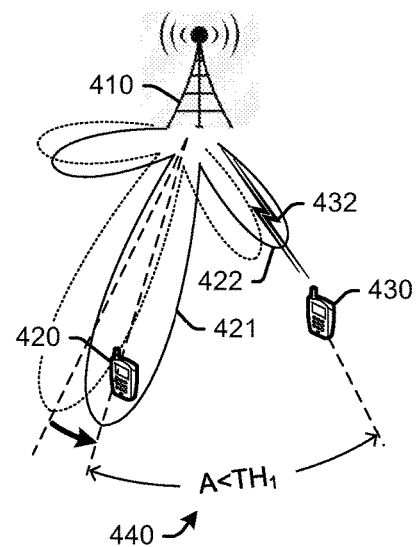
Figure 4C:
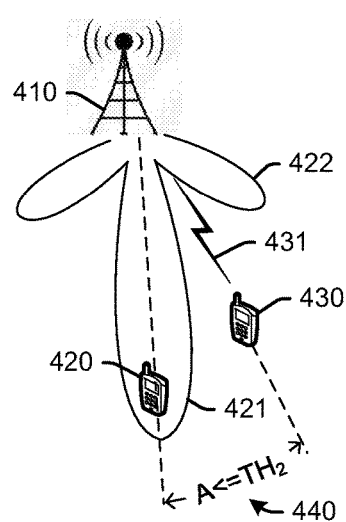

FIG. 4A-4C depict exemplary threshold angles for minimizing interference in a wireless network. Referring to FIG. 4A, an access node 410 is depicted as deploying a formed beam 421 (i.e., using a beamforming operating mode) to communicate with wireless device 420, and a communication link 431 (using a default operating mode) to communicate with wireless device 430. Wireless device 430 is at a fixed location, such that an angle 440 of formed beam 421 relative to the fixed location is above a threshold angle. The threshold angle may be based on a potential interference caused to communication link 431 by lobe 422 of formed beam 421. The threshold angles may be based on predetermined characteristics of lobe 422, such as a size that is known for a given antenna configuration of access node 410 and transmission power of formed beam 421. Transmission angle 440 can be measured relative to the fixed location of wireless device 430, or to a sector boundary (not shown), or to any other reference point that can be used by the access node.

As wireless device 420 moves, transmission angle 440 of formed beam 421 is monitored to determine whether or not is meet a threshold angle, such that is it is likely to cause interference to communication link 431. Referring now to FIG. 4B, it is determined that the transmission angle 440 of formed beam 421 meets (or in this case, becomes less than) the first threshold angle, such that lobe 422 causes interference to wireless device 430. Thus, an operating mode of wireless device 430 is switched from a default mode 431 (as shown in FIG. 4A) to an aggregated mode 432, i.e. a mode utilizing carrier aggregation. The aggregated mode utilizes a combination of the first carrier and a second carrier, or any combination of two carriers. The second carrier or at least one of the two carriers may comprise a carrier utilizing a different frequency band and/or operating mode than the first carrier. For example, the first carrier and/or the carrier of the formed beam may comprise a TDD carrier, and the second carrier may comprise an FDD carrier, such that transmissions 432 to wireless device 430 are not subject to interference caused by lobe 432.

As wireless device 420 continues moving in the same or similar direction, the transmission angle 440 of formed beam 421 may reach an angle wherein lobe 422 stops causing interference to transmissions between wireless device 430 and access node 410. Consequently, the operating mode of wireless device 430 may be switched back to the default mode 431. The second threshold angle may be defined relative to the fixed location or position of wireless device 430. Thus, if wireless device 430 changes its position, the thresholds are also changed, such that each threshold represents whether or not formed beam 421 may cause interference any wireless device at the given location.

The methods, systems, devices, networks, access nodes, and equipment described above may be implemented with, contain, or be executed by one or more computer systems and/or processing nodes. The methods described above may also be stored on a non-transitory computer readable medium. Many of the elements described herein may be, comprise, or include computers systems and/or processing nodes. This includes, but is not limited to: access nodes 110, 210, 410, controller node 107, and/or network 101.

Figure 5:
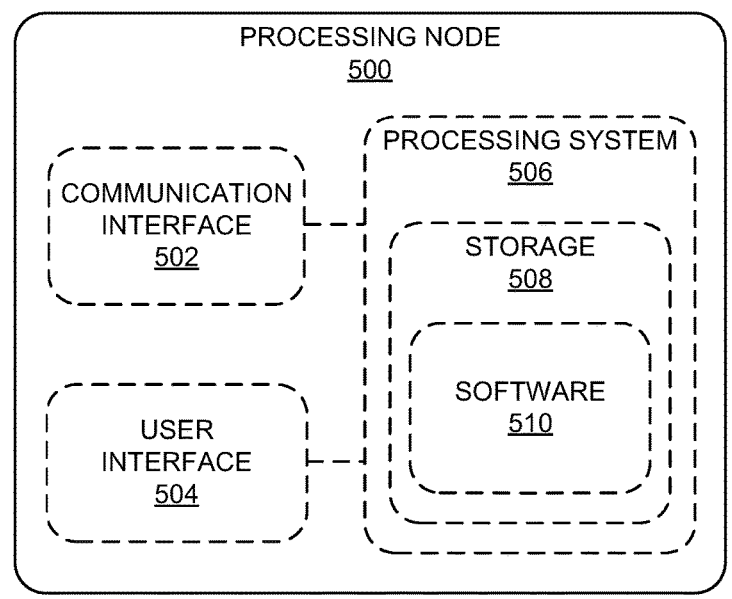
FIG. 5 depicts an exemplary processing node for minimizing interference in a wireless network.

FIG. 5 depicts an exemplary processing node 500 comprising a communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a scheduler module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a wireless network, the method comprising:
   determining that a first angle of a first formed beam directed towards a first wireless device meets a first threshold angle relative to a fixed location, wherein an interference is caused to a second wireless device at the fixed location by a lobe of the first formed beam upon the first angle meeting the first threshold angle;
   switching an operating mode of the second wireless device from a default mode to an aggregated mode;
   determining that the first angle meets a second threshold angle at which the interference is no longer caused to the second wireless device; and
   upon the first angle meeting the second threshold angle, switching the operating mode of the second wireless device back to the default mode,
   wherein in the aggregated mode, additional resources are scheduled for the second wireless device based in part on the interference.

2. The method of claim 1, wherein the first formed beam utilizes a first carrier, wherein the default mode utilizes the first carrier, and wherein the aggregated mode utilizes a combination of the first carrier and a second carrier.

3. The method of claim 2, wherein the first carrier comprises a time-division-duplexing (TDD) carrier and the second carrier comprises a frequency-division-duplexing (FDD) carrier.

4. The method of claim 3, wherein the additional resources for the second wireless device are scheduled on the FDD carrier.

5. The method of claim 2, wherein the aggregated mode does not utilize a formed beam.

6. The method of claim 1, wherein the first threshold angle is based on a size of the lobe.

7. The method of claim 6, wherein the size of the lobe is predetermined based on a combination of an antenna configuration of an access node deploying the formed beam and on the first angle.

8. A system for minimizing interference in a wireless network, the system comprising:
    a processing node; and
    a processor coupled to the processing node, the processor for configuring the processing node to perform operations comprising:
    obtaining one or more interference measurements for each of a plurality of transmission angles of a first formed beam directed towards a first wireless device, wherein the one or more interference measurements for each transmission angle are associated with a fixed location;
    determining a first threshold angle based on the one or more interference measurements for each transmission angle, wherein upon the transmission angle of the formed beam meeting the first threshold angle, an operating mode of a second wireless device at the fixed location is switched to from a default mode to a carrier aggregation mode; and
    determining a second threshold angle based on the one or more interference measurements for each transmission angle, wherein upon the transmission angle of the formed beam meeting the second threshold angle, the operating mode of the second wireless device at the fixed location is switched back to the default mode.

9. The system of claim 8, wherein upon the transmission angle meeting the first threshold angle, an interference is caused to the second wireless device by a lobe of the first formed beam.

10. The system of claim 9, wherein upon the transmission angle meeting the second threshold angle, the interference is not caused to the second wireless device.

11. The system of claim 10, wherein both first and second threshold angles are further based on a size of the lobe.

12. The system of claim 8, wherein the transmission angle and the first and second threshold angles are relative to the fixed location.

13. The system of claim 8, wherein the carrier aggregation mode aggregates a time-division-duplexing carrier and a frequency-division-duplexing carrier.

14. The system of claim 8, wherein the carrier aggregated mode aggregates two frequency-division-duplexing carriers.

15. A processing node for minimizing interference in a wireless network, the processing node being configured to perform operations comprising:
    determining an interference caused by a first formed beam directed towards a first wireless device based on a first angle of the first formed beam meeting a first threshold angle relative to a fixed location, wherein the interference is caused to a second wireless device at the fixed location upon the first angle of the first formed beam meeting the first threshold angle;
    switching an operating mode of the second wireless device to an aggregated mode based on the interference;
    determining that the first angle meets a second threshold angle at which the interference is no longer caused to the second wireless device; and
    upon the first angle meeting the second threshold angle, switching the operating mode of the second wireless device back to the default mode,
    wherein the aggregated mode aggregates two different carriers.

16. The processing node of claim 15, wherein the aggregated mode aggregates a time-division-duplexing (TDD) carrier and a frequency-division-duplexing (FDD) carrier.

17. The processing node of claim 16, wherein both the first and second formed beams utilize the (TDD) carrier.

18. The processing node of claim 17, wherein the operations further comprise scheduling resources for the second wireless device on the FDD carrier based in part on the interference caused to the second wireless device.

* * * * *